United States Patent
Sussman et al.

(10) Patent No.: US 7,424,107 B2
(45) Date of Patent: Sep. 9, 2008

(54) METHOD AND SYSTEM FOR REQUESTING HELP

(75) Inventors: Jeremy Sussman, Bedford Hills, NY (US); Jim Christensen, Cortlandt Manor, NY (US); Stephen Eric Levy, Honolulu, HI (US); William Bennett, Tucson, AZ (US); Tracee Wolf, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 11/335,691

(22) Filed: Jan. 20, 2006

(65) Prior Publication Data

US 2007/0172035 A1 Jul. 26, 2007

(51) Int. Cl.
*H04M 3/00* (2006.01)

(52) U.S. Cl. ............................. 379/265.12; 379/88.18; 379/88.14; 379/203.01

(58) Field of Classification Search ............ 379/265.12, 379/88.18, 203.01
See application file for complete search history.

(56) References Cited

U.S. PATENT DOCUMENTS

| 6,058,435 | A | * | 5/2000 | Sassin et al. ................. 719/331 |
| 6,125,178 | A | * | 9/2000 | Walker et al. .......... 379/211.01 |
| 6,389,132 | B1 | * | 5/2002 | Price ..................... 379/265.01 |
| 6,647,111 | B1 | * | 11/2003 | Bjornberg et al. ....... 379/220.01 |

* cited by examiner

*Primary Examiner*—Fan Tsang
*Assistant Examiner*—Simon Sing
(74) *Attorney, Agent, or Firm*—Vazken Alexanian; McGinn IP Law Group, PLLC (57) ABSTRACT

A method (and system) of requesting help includes connecting a user to a help request generator, accessing, by the help request generator, a database including a list of helpers, selecting at least one helper from the list of helpers, and transmitting a help request from the help request generator to the at least one helper.

1 Claim, 6 Drawing Sheets

METHOD AND SYSTEM FOR REQUESTING HELP

BACKGROUND OF THE INVENTION

1. Field of the Invention

The present invention relates to the field of providing end-user help for information technologies. Unlike conventional methods in which such help is provided either by having a dedicated staff or expecting the user to perform self-help, the present invention may allow a user to leverage a social network to get help from someone other than a dedicated staff.

2. Description of the Related Art

Telephones are being used in novel and diverse manners. Whereas once the phone was a mechanism for calling a single person, today phones are used to call into teleconferences, to retrieve voice mail, to page people, and to retrieve information such as train schedules or stock portfolio information. Moreover, as more and more applications become voice enabled, the phone will become an even more important end-user device.

However, one of the primary problems with using the phone as such an application device is the extremely constrained user interface. When some exceptional condition occurs in the course of a telephone session, there is little that the end-user can do, other than hang up and try again. Most telephony applications therefore include the ability to "escape out" of the session and connect with a help desk operator.

Thus, such a conventional system and method require that the organization hosting the service provide help-desk personnel to answer these requests for help. This represents a costly amount of overhead for such applications, and may prohibit many such telephony applications from being deployed.

SUMMARY OF THE INVENTION

In view of the foregoing and other exemplary problems, drawbacks, and disadvantages of the conventional methods and structures, a purpose of the exemplary aspects of the present invention is to provide a method and system for requesting help which may eliminate the need for a help-desk person, and may, therefore, provide significant cost savings to an organization.

An exemplary aspect of the present invention includes a method of requesting help which includes connecting a user to a help request generator, accessing, by the help request generator, a database including a list of helpers, selecting at least one helper from the list of helpers, and transmitting a help request from the help request generator to the at least one helper (e.g., to a device associated with the at least one helper).

In another exemplary aspect of the present invention, a method of requesting help includes connecting a user to a voice application, escaping from the voice application and connecting the user to a help request generator, accessing, by the help request generator, a database including a list of helpers, selecting at least one helper from the list of helpers, and transmitting a help request from the help request generator to the at least one helper.

In another exemplary aspect of the present invention, a system for requesting help includes a help request generator for generating and transmitting a help request, a database which includes a list of helpers, and is accessible by the help request generator, a communication device for connecting a user to the help request generator, and selecting at least one helper from the list of helpers, and a help request receiving device associated with the at least one helper, for receiving the help request.

In another exemplary aspect of the present invention, a system for requesting help includes a help request generator for generating and transmitting a help request, a database which includes a list of helpers, and is accessible by the help request generator, a communication device for connecting a user to a voice application, the communication device including an escape mechanism for escaping from the voice application to connect with the help request generator, and a selector for selecting at least one helper from the list of helpers, and a help request receiving device associated with the at least one helper, for receiving the help request.

Another exemplary aspect of the present invention includes a method for providing assistance to a telephone user in a voice application. The method includes connecting the user to the voice application, in response to a request for information of the user, contacting by the voice application, a person other than a help-desk person whom the user believes can provide a solution to satisfy the request, enabling the user to express the request to the person, automatically obtaining by the voice application, the solution from the person, and directing, by the user, the voice application to execute the solution.

Another aspect of the present invention includes a programmable storage medium tangibly embodying a program of machine-readable instructions executable by a digital processing apparatus to perform the method according to the exemplary aspects of the present invention.

In still another aspect, the method according to the exemplary aspects of the present invention may include deploying computing infrastructure in which computer-readable code is integrated into a computing system, such that the code and the computing system combine to perform the method.

With its unique and novel features, the present invention provides a method and system for requesting help which may eliminate the need for a help-desk person, and may, therefore, provide significant cost savings to an organization.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1A-6, there are shown exemplary embodiments of the method and structures of the present invention.

Overview

As more and more business processes are automated, the human capability to handle exceptional cases becomes more rare. This results in a greater need for third-party help, often in the form of a dedicated help staff.

However, such a staff has a very high cost. For example, many telephony applications today require live operators to serve as a help desk. This is cost prohibitive and prevents many telephony applications from being deployed in many organizations. Additionally, most organizations have a dedicated help staff to assist their employees with all of their business processes. Again, this is a costly part of running a business, In the present invention, on the other hand, instead of expecting all application exceptions to be resolved by a phone call to a dedicated help staff, a mechanism may be provided for the user to request and receive help via a "help network" which may include, for example, a set of area-experts (e.g., information technology (IT) experts, human resources experts, etc.), a social network of the person in need, and/or persons located at an intersection of those two sets. The user can use the present invention to contact a helper using any of a number of communication means (e.g., telephony, instant messaging, etc.).

For example, if the user (e.g., the original caller) wants to get to a conference call but is having trouble recalling the correct phone number/passcode combination, the user may escape from the conference call application and send a help request to the helper (e.g., the person contacted by the user). The helper may be, for example, a participant in the conference and could give the system permission to have the user connected directly to the conference call. The helper may also be presented with the option of requesting the user to call the helper. In either case, the user would not be required to make a new phone call.

Further, the options available to the helper in responding to the help request may be application dependent. For example, if the user is attempting to use a voice application other than a conference call application, instead of being presented with the option of directly connecting the user to the conference call, the helper may be presented with the option of forwarding a passcode for entering the voice application by sending an e-mail message to the user.

The present invention may also allow applications (e.g., any automated application) to include a help mechanism. This help mechanism may provide the person needing help with the ability to easily tap into the "help network" (e.g., a set of area-experts, a social network of the person in need, and/or persons located at an intersection of those two sets).

For example, if a user needs help in filling in a travel expense report, he might quickly determine who from among his closest peers has recently done so, and choose someone to help him from among that group. The manner of communication (e.g., contact) between the user and the helper can take any of a number of forms, such as e-mail, instant message, SMS, telephone call, etc. In addition, the manner of communication may at least partially on the situation and need of the user needing help. Further, the possible responses (e.g., methods of responding) of the helper may also be application specific.

For example, in an exemplary aspect of the present invention, instead of escaping from the telephony application to a manned help desk, the user may instead escape to a sub-application in which the user can ask someone (e.g., someone known by the user) for help. That someone (e.g., the helper) who was contacted by the user may help the user in a number of different ways, including sending the user an e-mail message, or instant message (IM) or connecting the user's phone session to a difference application/person.

The present invention may include significant advantages over conventional systems which rely heavily on help desk personnel. For example, the organization deploying the voice application may realize significant monetary savings, and a better end-user experience.

For example, a possible scenario in which the present invention may be effectively utilized may deal with the original caller who needs help (hereafter the "user") and the person who provides help to the caller (hereafter the "helper").

The user calls into some voice application and runs into some exceptional case. For example, the user cannot recall the correct passcode for a conference to which he is invited. The system provides some escape mechanism to get to this help (e.g., the caller may input an escape instruction by pressing the "*" key on the keypad of his telephone).

The system may respond to this input by providing a mechanism for the user to identify a person who might help the user. For example, the system (e.g., the help request generator) may access or maintain a database which includes data on the user (e.g., name, position in organization, etc.), and access this database (e.g., and/or other databases) to generate a list of potential helpers based on this data (e.g., based on contextual information about the user, such as their administrative staff, their organizational chart, the contents of their calendar, and their "buddy list"). The user could identify a helper from the list generated by the help request generator by using a search mechanism from the telephone keypad (e.g., by entering the desired helper's phone number or use the alpha-numeric keys to enter the helper's last name).

Once a potential helper is identified, the system may contact that helper. This contact may take the form of a phone call, a text message (instant message or short message service (SMS)), a page, etc. The potential helper may be provided with a set of simple options to help the user (e.g., connect the user to the helper's phone, connect the user to a conference call, direct the user to the correct telephony application, type a message to be read to the user). The user may then receive the help specified by the helper.

Exemplary Aspects

Figure 1A:
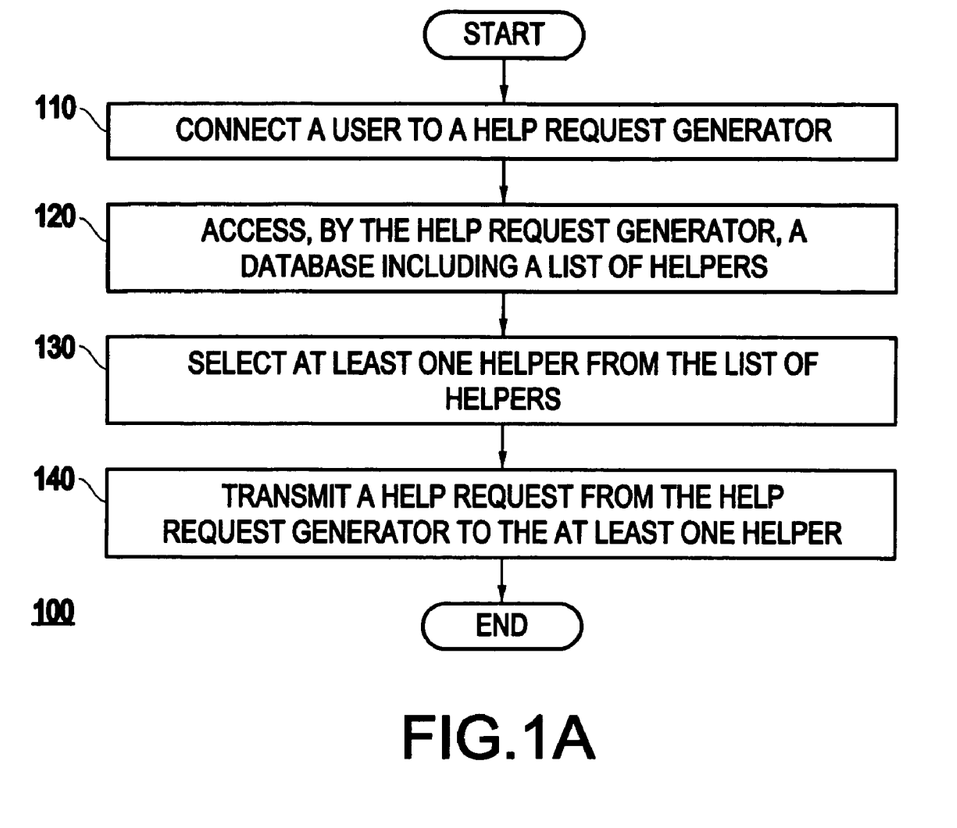
FIG. 1A illustrates a method 100 of requesting help, according to an exemplary aspect of the present invention.

Referring again to the drawings, FIG. 1A illustrates a method 100 of requesting help, according to an exemplary aspect of the present invention. The method 100 includes connecting (110) a user to a help request generator (HRG) (e.g., via a communication link), accessing (120), by the help request generator, a database (e.g., a plurality of databases) including a list of helpers, selecting (130) at least one helper (e.g., a plurality of helpers) from the list of helpers, and transmitting (140) a help request from the help request generator to the at least one helper (e.g., a plurality of helpers).

For example, the user may connect to the HRG by using a communication device, which may include, for example, any communication device that may be used to connect (e.g., wired or wirelessly connect) via a communication medium to another device such as another telephone, or a voice application (e.g., a conferencing device). For example, a "communication device" may be construed herein to include a conventional telephone on a public switched telephone network (PSTN), a mobile (e.g., cellular) telephone, a personal computer, a notebook computer, a personal digital assistant (PDA), a Blackberry device, etc. Similarly, the at least one helper may receive the help request (e.g., and transmit a response to the help request) by using a help request receiving device which may include such a communication device.

Figure 1B:
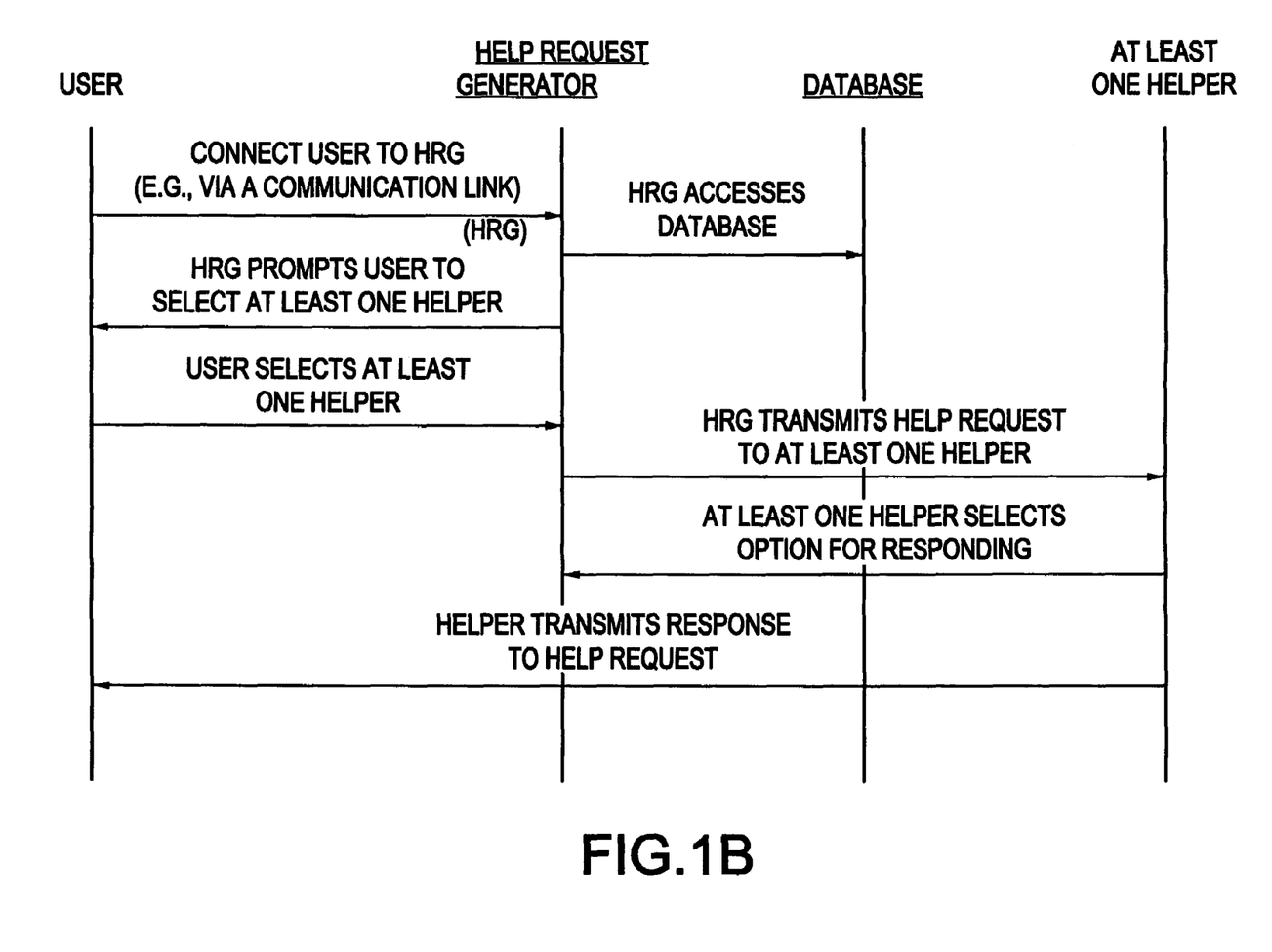
FIG. 1B provides a chart for further illustrating a method according to an exemplary aspect of the present invention.

As illustrated in the chart (e.g., timeline) of FIG. 1B, in an exemplary aspect of the present invention, the user may use a communication device (e.g., place a call using a telephone) to connect (e.g., via a communication medium) to the HRG. The HRG may then access (e.g., using a wireless or a wired connection) a database and prompt the user to select at least one helper from the database (e.g., the database may include, for example, the user's "Buddy List" from an instant messaging (IM) browser or web browser stored on the user's personal computer). The user may then use the communication device to select (e.g., by pressing a key on a keypad or speaking in to a microphone in a telephone) at least one user from the database.

The HRG receives the selection from the user and transmits a help request to the at least one helper (e.g., via a communication link). As noted above, the help request may be transmitted by any of several manners, such as by instant messaging (IM). Further, the helper may receive the help request by using a help request receiving device (e.g., a communication device) which may include, for example, a personal computer which is associated with the helper. The help request may include, for example, a request for one of a phone number, a password, and a personal identification number (PIN).

The helper may then select an option for responding to the help request, and transmit the selection to the HRG (e.g., using the help request receiving device such as his personal computer). The helper may then (e.g., using the help request receiving device) transmit the response to the help request to the user. It should be noted that the helper may respond to the help request in a manner that is different from the manner in which he received the help request. For example, the helper may receive the help request via an instant message, but transmit a response to the user by using e-mail.

An important feature of the present invention involves the use of a help request generator (HRG) to generate and transmit a help request. For example, the help request generator may receive a communication (e.g., via a communication link) from the communication device (e.g., telephone) of user, and transmit a help request (e.g., via a communication link) to the at least one helper. The HRG may also access the database and to produce a list of helpers (e.g., generate a list of possible helpers).

Further, if the helper selects the option for typing a message to the user, the help request generator may convert the typed message into an audio message and transmit the audio message to the user via the communication device (e.g., the user's telephone).

In addition, the help request generator may automatically determine a manner of transmitting a help request to the helper. Alternatively, the user may use the communication device to input a manner of transmitting the help request to the helper.

The help request generator may also store help request history data which may include, for example, a history of help requests for the user, helpers contacted by the help request generator, etc.

The HRG may be software implemented (e.g., at least partially software implemented) and may be fully automated. That is, instruction code may be stored on a programmable storage medium (e.g., a hard drive) and executed by a computing device (e.g., processor, computer, etc.) to perform at least part of the functions of the HRG (It should also be noted that the helper may include an automated helper and may be at least partly software implemented).

Further, the HRG may be connected to an organization's network server For example, the HRG may be at least partly implemented as software stored on a hard drive of an organization's network server. In this case, when the helper has a work station (e.g., a personal computer) on the network, the help request can be transmitted to the work station (e.g., help request receiving device) via the organization's network.

Alternatively, in the case that the helper is not connected to the HRG via an organizational network such as an intranet, the HRG may generate an electronic mail message and transmit the e-mail message (e.g., via an e-mail server connected to the Internet) to a helper's work station (e.g., the helper's personal computer which is connected to the Internet, or the helper's Blackberry™ device, etc.). In this case, the helper may view the e-mail message and respond to the e-mail message using the e-mail browser on the display of the helper's help request receiving device (e.g., computer, Blackberry™ device, etc.).

For example, the text of the e-mail message may recite the specific request of the user (e.g., "Please send me the passcode for entering the teleconference", etc.). The e-mail message may also include a list of the options for responding to the help-request. For example, the e-mail message may include the phone number, e-mail address, etc. for the user, and may identify a preferred manner of responding to the help request.

Further, the HRG may transmit the help request via one of a telephone call, electronic mail (e-mail), instant messaging (IM), a page, and a short messaging service (SMS). the help request generator may also prompt the user to select the database from among a plurality of databases. In response to this prompt, the user may select the database from among the plurality of databases (e.g., by using the communication device).

Further, upon accessing the database, the HRG may cause a content of the database to be read out to the user via the communication device. Further, the user may select the at least one helper by using one of an alpha-numeric keypad on the communication device and a voice input to the communication device to make a selection.

In addition, the help request may include a response mechanism for allowing the helper to respond to the help request. For example, the response mechanism may include a plurality of options for responding to the help request. The plurality of options may include, for example, an option for connecting the helper to the user's communication device (e.g., the user's telephone), an option for connecting the user to a conference call, an option for directing the user to a voice application, and an option for typing a message to the user.

The database may include, for example, a set of area-experts, a social network of the user, or an intersection of the set of area experts and the social network. Further, the database (e.g., the list of helpers in the database) may include at least one of an administrative staff, an organizational chart, a content of a calendar of the user, and an instant messaging (IM) buddy list of the user.

In addition, the user may use the communication device to direct the help request generator to transmit a termination message which terminates the help request. In this case, the method 100 may also include transmitting the termination message to the at least one helper to which the help request was transmitted.

In addition, the help request generator may automatically generate a termination message and transmit it to a helper, for example, after a predetermined amount of time (e.g., one hour, one day, etc.), or upon the occurrence of some predetermined event (e.g., upon the user (e.g., caller) hanging up the telephone, or otherwise exiting the help request function).

Figure 2:
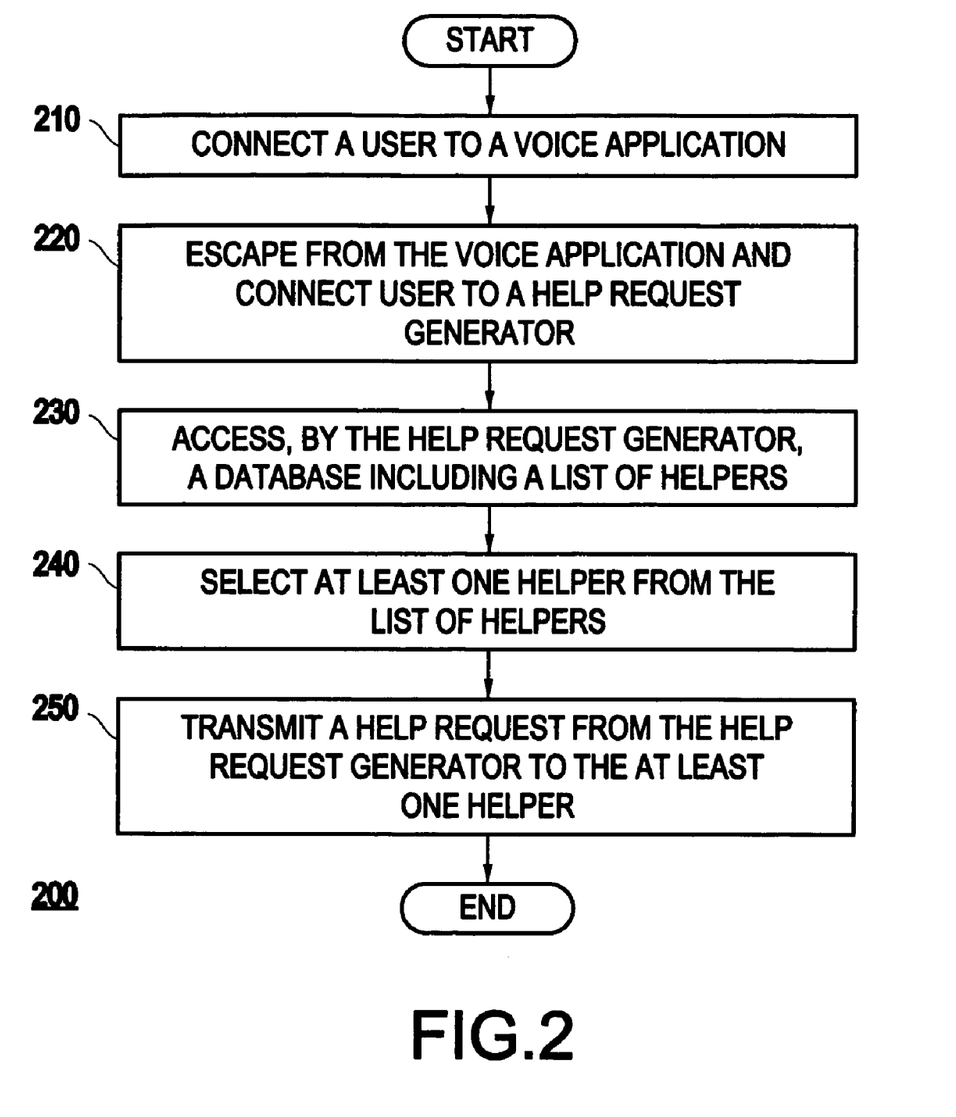
FIG. 2 illustrates a method 200 of requesting help according to another exemplary aspect of the present invention.

FIG. 2 illustrates a method 200 of requesting help according to another exemplary aspect of the present invention. The method 200 of requesting help, may include connecting (210) a user to a voice application (e.g., an automated voice application such as an automated conference call), escaping (220) from the voice application and connecting the user to a help request generator, accessing (230), by the help request generator, a database including a list of helpers, selecting (240) at least one helper from the list of helpers, and transmitting (250) a help request from the help request generator to the at least one helper.

For example, in the method 200, the user may connect to the voice application via a communication link by using a communication device. The user may also use the communication device to escape from the voice application and connect to the help generator. For example, escaping from the voice application may include, for example, using one of a keypad on the communication device (e.g., telephone) and a voice input to input an escape direction. Similarly, the at least one helper may receive the help request (e.g., and transmit a response to the help request) via a communication link by using a help request receiving device (e.g., a communication device).

A "voice application" may include, for example, a conference call or other application (e.g., an automated application) to which a user may connect via a communication link by using a communication device.

Further, in this exemplary aspect, the help request generator (HRG) may transmit the help request in a manner which is dependent upon a characteristic of the voice application. In addition, the help request may include a response mechanism for allowing the helper to respond to the help request, and the response mechanism may include options which are dependent upon a characteristic of the voice application.

Figure 3:
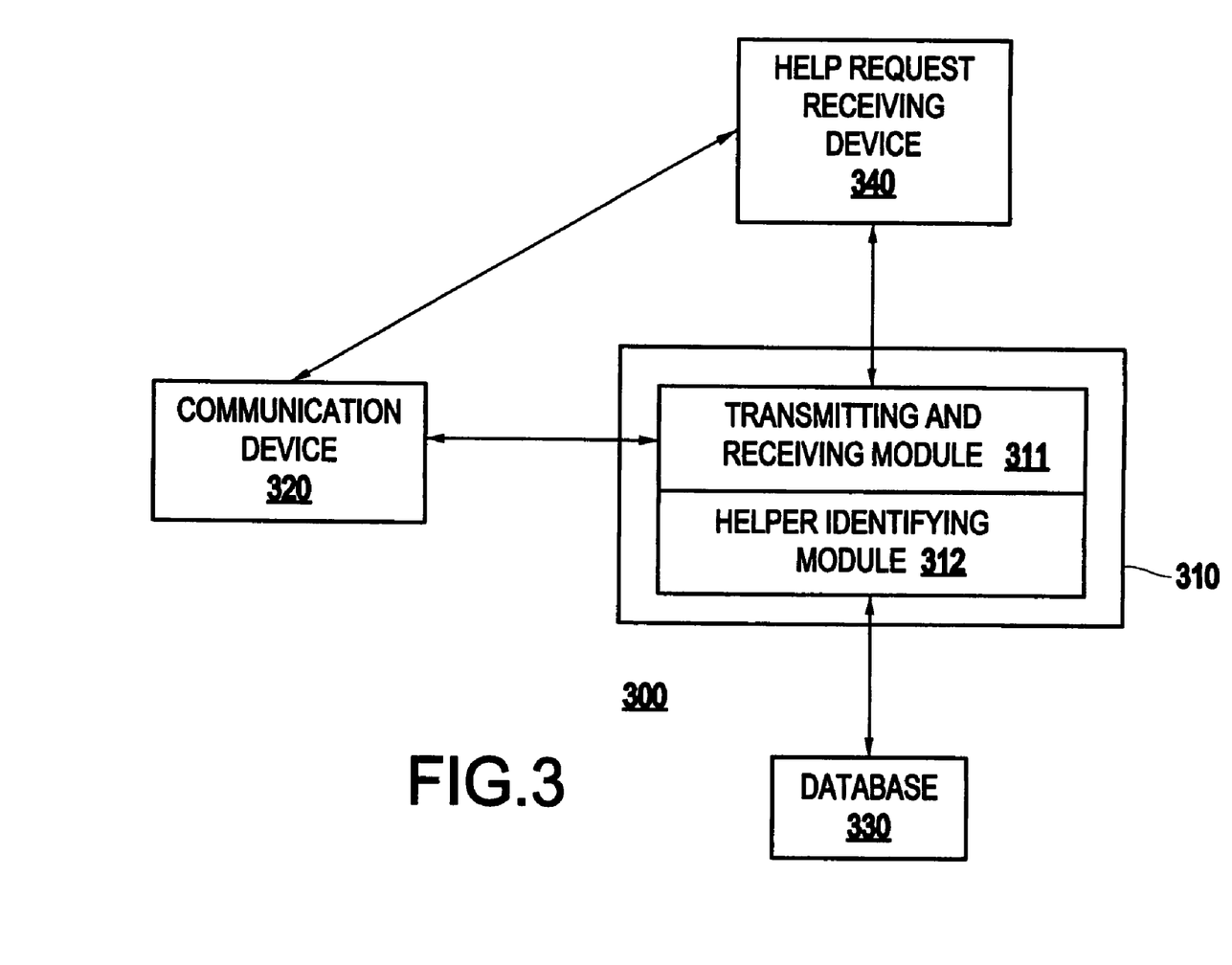
FIG. 3 illustrates a system 300 for requesting help according to another exemplary aspect of the present invention.

FIG. 3 illustrates a system 300 for requesting help according to another exemplary aspect of the present invention. As illustrated in FIG. 3, the system 300 may include a help request generator 310 for generating and transmitting a help request, a database 330 (e.g., a Buddy List stored on an instant messaging (IM) browser) which includes a list of helpers, and is accessible by the help request generator, a communication device 320 for connecting a user to the help request generator, and selecting (e.g., using a selecting device which includes at least one of keypad, microphone, etc.) at least one helper from the list of helpers, and a help request receiving device 340 (e.g., a communication device) associated with the at least one helper, for receiving the help request.

The help request receiving device 340 may include a receiving and transmitting module, for receiving the help request transmitted from the help request generator, and transmitting a response to the help request, and at least one of a display device and an audio device for communicating the help request to the at least one helper. The help request receiving device 340 may also include an input device (e.g., a keypad, microphone, mouse, etc.) for inputting a response to the help request.

An important feature of the present invention is the help request generator (HRG) 310. For example, the help request generator 310 may include a receiving and transmitting module 311, for receiving a communication from the communication device (e.g., for connecting via a communication link with the communication device), and transmitting a help request to the at least one helper (e.g., via a communication link). The HRG 310 may also include a helper identifying module 312 for accessing the database and identifying the at least one helper (e.g., generating a list of possible helpers to be forwarded to the user).

Further, the HRG 310 may include a converter for converting a typed message into an audio message. Thus, for example, if the helper selects the option for typing a message to the user, the help request generator 310 may convert the typed message into an audio message and transmit the audio message to the user via the communication device.

The help request generator 310 may also include a memory (e.g., a hard drive, random access memory (RAM), etc.) for storing data such as help request history data, which may include, for example, a history of help requests for the user, and helpers contacted by the help request generator.

Further, the HRG 310 may include a learning function which may allow the HRG 310 to improve or refine a performance over time. This may help the system to increase over time the likelihood that the user will receive a valuable response to his help request. The learning function may include, for example, the use of neural networks, bayesian belief networks, etc.).

For example, the responses to the help requests may also be (e.g., at the time the helper responds to the help request) forwarded to the HRG 310 and stored as data in a memory of the HRG 310. Therefore, the list of possible helpers forwarded to the user by the HRG 310 may be based on this data. Thus, for example, if a helper has not responded or has responded negatively (e.g., providing no help) to user (e.g., other users) in the past, the HRG 310 may remove this particular helper from a list of possible helpers, before forwarding the list to the user.

The help request generator 310 may also include a converter for converting a text message into an audio message. Thus, if the response to the help request includes a typed message, the converter may convert the text message into an audio message and the help request generator may transmit the audio message to the user via the telephone.

The system 300 may also include an instant messaging server in communication with the help request generator. In this case, the help request may be transmitted by instant messaging (IM) from the help request generator through the instant messaging server to the help request receiving device.

The system 300 may also include an electronic mail server in communication with the help request generator. In this case, the help request may be transmitted by electronic mail from the help request generator through the electronic mail server to the help request receiving device.

Figure 4:
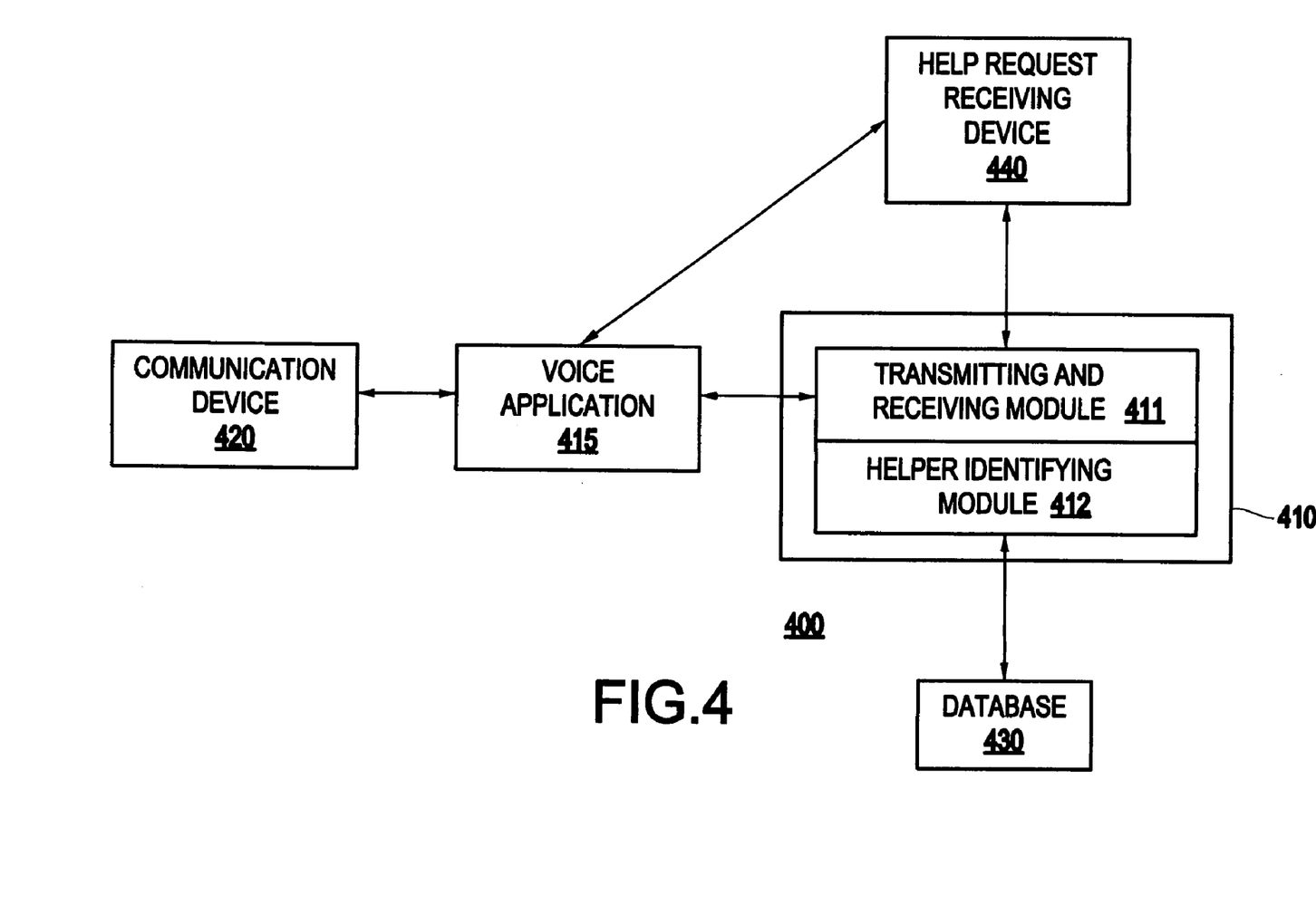
FIG. 4 illustrates a system 400 for requesting help, according to another exemplary aspect of the present invention.

FIG. 4 illustrates a system 400 for requesting help, according to another exemplary aspect of the present invention. The system 400 includes a help request generator 410 for generating and transmitting a help request, a database 430 which includes a list of helpers, and is accessible by the help request generator, a communication device 420 for connecting a user to a voice application 415, the communication device including an escape mechanism for escaping from the voice application 415 to connect with the help request generator 410 and a selector for selecting at least one helper from the list of helpers, and a help request receiving device 440 (e.g., communication device) associated with the at least one helper, for receiving the help request.

The help request generator 410 may include a receiving and transmitting module 411, for receiving a telephonic communication from the communication device, and transmitting a help request to the at least one helper, and a helper identifying module 412 for accessing the database and identifying the at least one helper (e.g., generating a list of possible helpers).

In another exemplary aspect of the present invention, a method for providing assistance to a telephone user in a voice application includes connecting the user to the voice application, in response to a request for information of the user, contacting by the voice application, a person other than a help-desk person whom the user believes can provide a solution to satisfy the request, enabling the user to express the request to the person, automatically obtaining by the voice application, the solution from the person, and directing, by the user, the voice application to execute the solution.

Figures 5, 6:
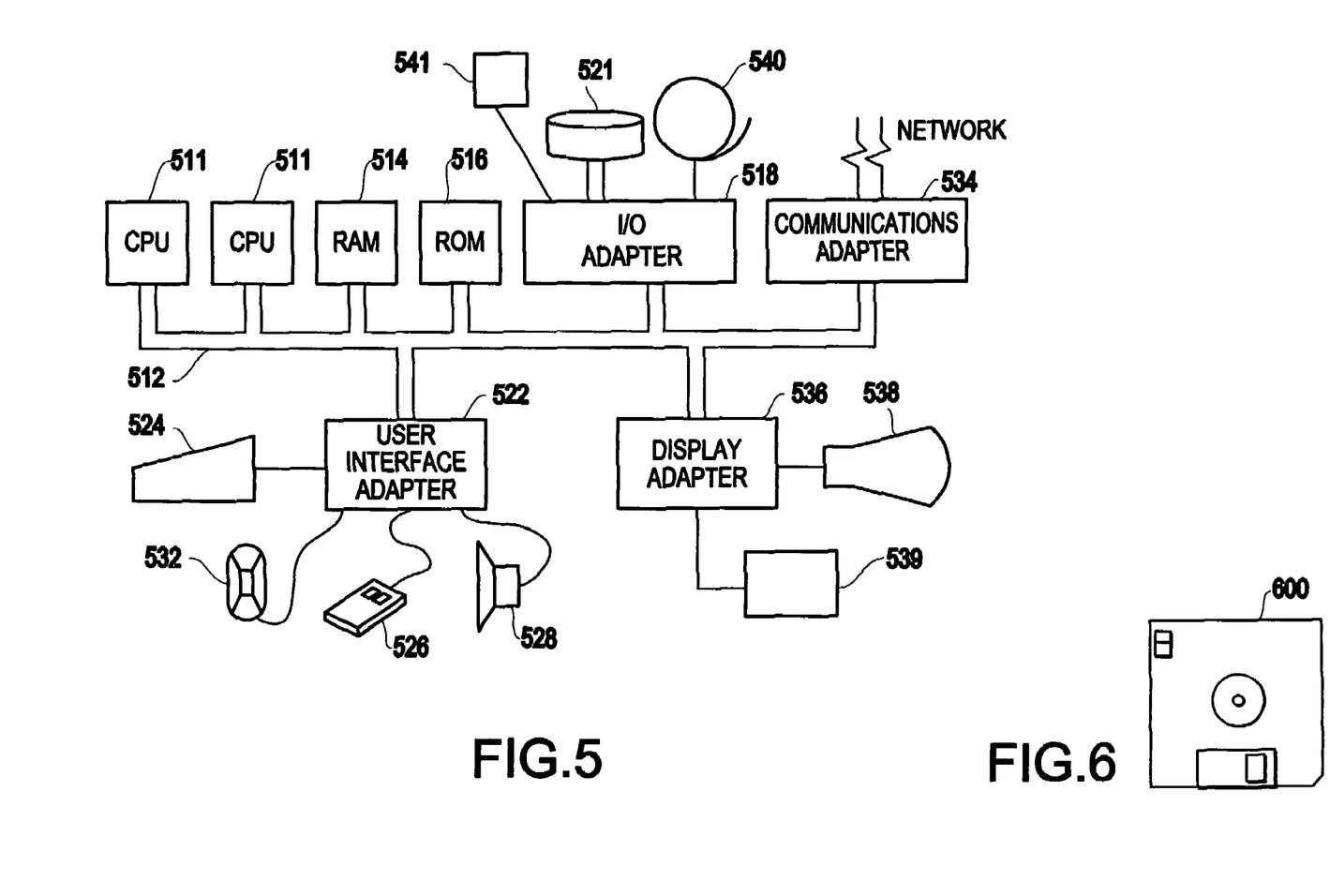
FIG. 5 illustrates a typical hardware configuration which may be used for implementing the system and method according to the exemplary aspects of the present invention.
FIG. 6 illustrates a programmable storage medium 600 tangibly embodying a program of machine-readable instructions executable by a digital processing apparatus to perform the method according to the exemplary aspects of the present invention.

Referring again to the drawings, FIG. 5 illustrates a typical hardware configuration which may be used for implementing the computer system and method according to the exemplary aspects of the present invention. The configuration has preferably at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, and Intranet, a personal area network (PAN), etc., and a display adapter 536 for connecting the bus 512 to a display device 538 and/or printer 539. Further, an automated reader/scanner 541 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 511 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 511 and hardware above, to perform the method of the invention.

This signal-bearing media may include, for example, a RAM contained within the CPU 511, as represented by the fast-access storage for example. Alternatively, the instructions may be contained in another signal-bearing media, such as a magnetic data storage diskette 600 (FIG. 6), directly or indirectly accessible by the CPU 511.

Whether contained in the computer server/CPU 511, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C" etc.

With its unique and novel features, the present invention provides a method and system for requesting help which may eliminate the need for a help-desk person, and may, therefore, provide significant cost savings to an organization.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A method of requesting help, comprising:
connecting a user to a help request generator;
prompting, by said help request generator, said user to select a helper from a database comprising a list of helpers including a set of area-experts, a social network of said user, and an intersection of said set of area-experts and said social network;
accessing, by said help request generator, said database comprising said list of helpers;
selecting said helper from said list of helpers; and
transmitting a help request from said help request generator to said helper,
wherein said transmitting said help request comprises transmitting said help request via a communication link by using one of a telephone call, electronic mail (e-mail), instant messaging (IM), a page, and a short messaging service (SMS),
wherein said connecting said user to said help request generator comprises using a telephone,
wherein said accessing said database comprises reading out a content of said database to said user via said telephone,
wherein said selecting said helper comprises using one of an alpha-numeric keypad on said telephone and a voice input to said telephone to make a selection,
wherein said help request comprises a response mechanism for allowing said helper to respond to said help request,
wherein said response mechanism comprises a plurality of options for responding to said help request,
wherein said plurality of options comprises an option for connecting said helper to said telephone used by user, an option for connecting said user to a conference call, an option for directing said user to a voice application, and an option for typing a message to said user, and
wherein if said helper selects said option for typing a message to said user, said help request generator converts said typed message into an audio message and transmits said audio message to said user via said telephone used by user.

* * * * *